UNITED STATES PATENT OFFICE.

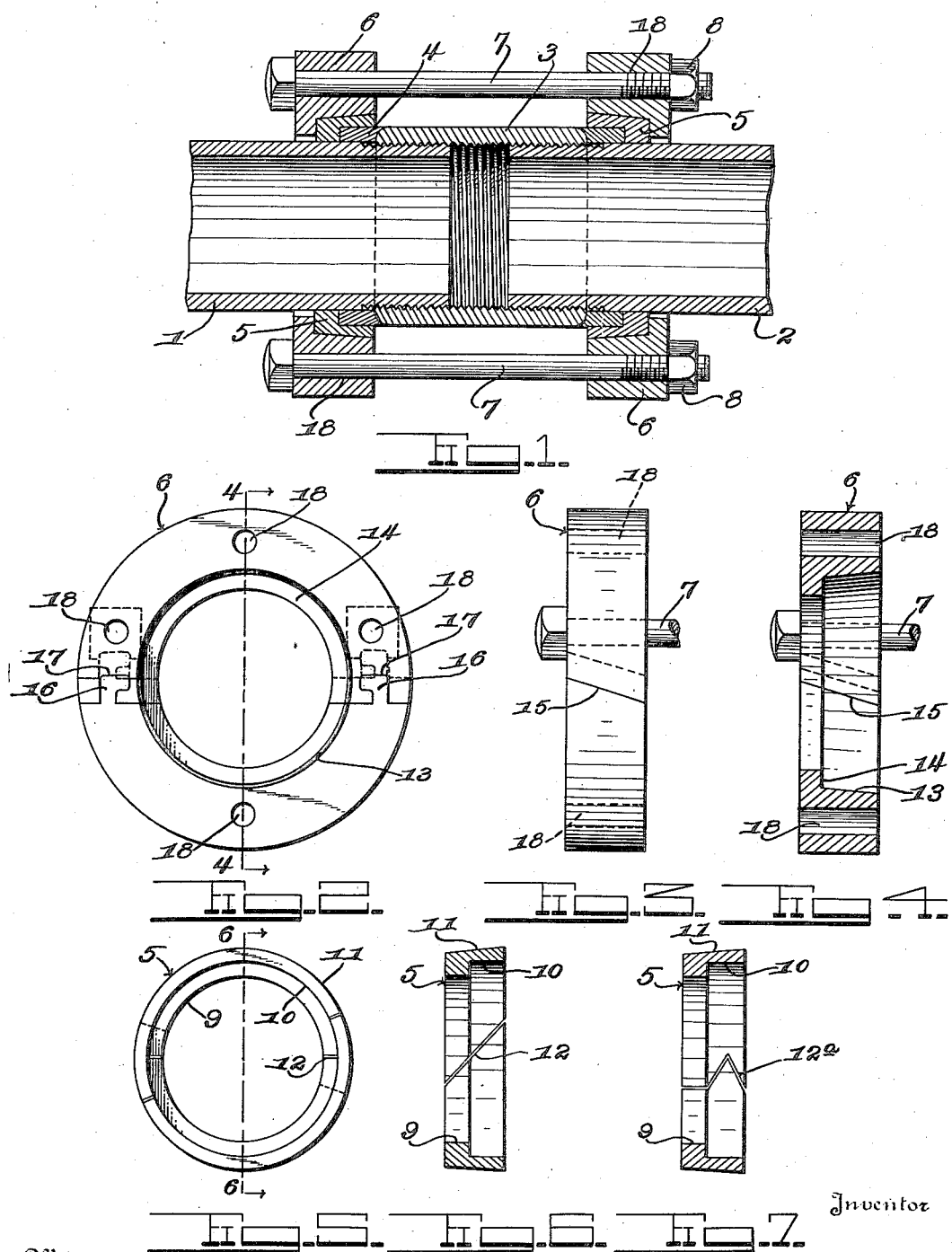

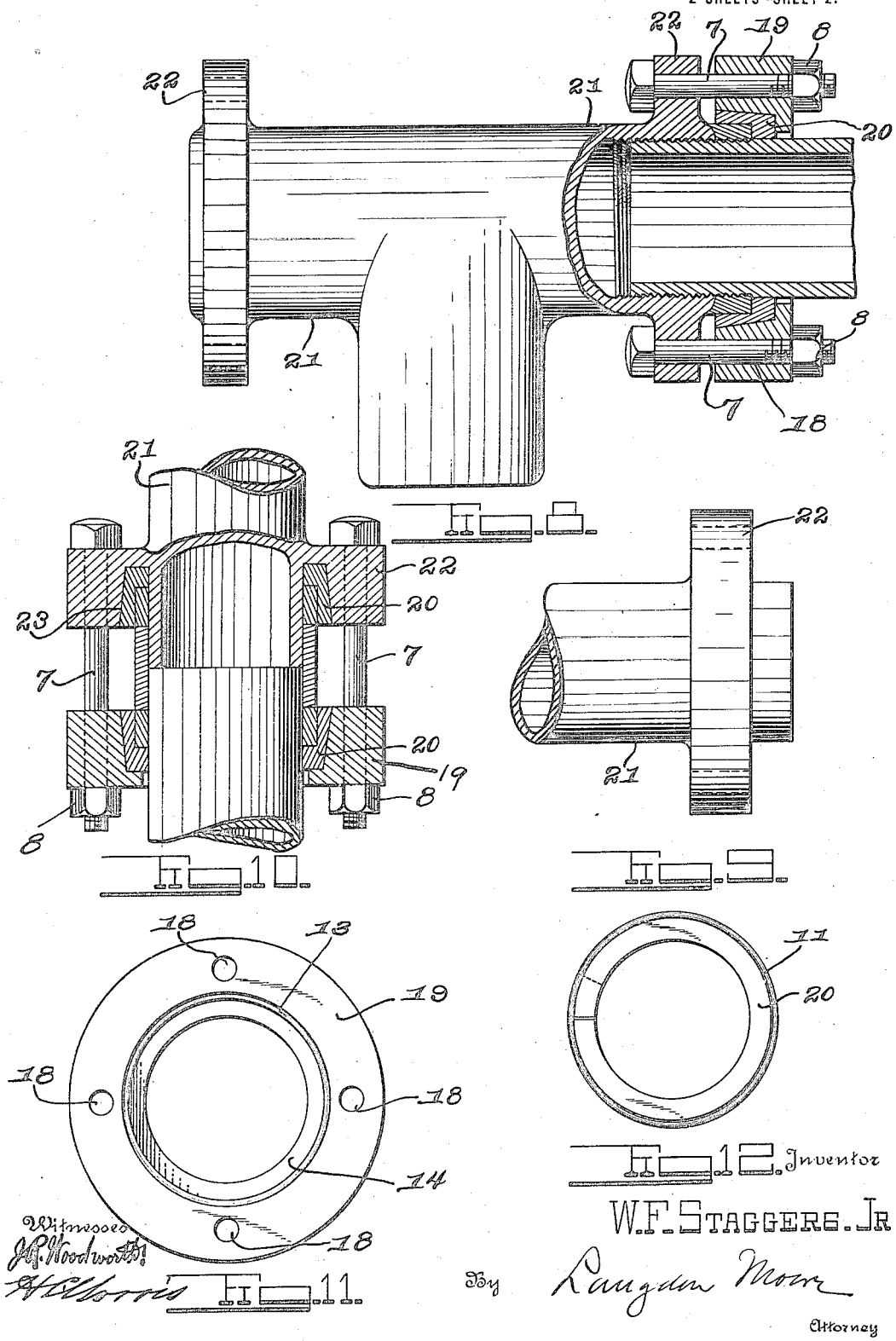

WILLIAM F. STAGGERS, JR., OF MANNINGTON, WEST VIRGINIA.

PIPE-COUPLING.

1,163,277.   Specification of Letters Patent.   Patented Dec. 7, 1915.

Application filed May 29, 1915. Serial No. 31,293.

*To all whom it may concern:*

Be it known that I, WILLIAM F. STAGGERS, Jr., a citizen of the United States, residing at Mannington, in the county of Marion and State of West Virginia, have invented new and useful Improvements in Pipe-Couplings, of which the following is a specification.

This invention relates to improvements in pipe couplings and more particularly to an attachment therefor to prevent leaking.

It is the object of this invention to provide an attachment that may be applied to a pipe line that has been coupled or applied at the time of coupling of the pipe that will compress the packing first about the surface of the pipe and then hold it firmly against the coupling sleeve.

It is also an object of this invention to provide L and T joints with means for utilizing this attachment.

The advantages of this invention are that it can be constructed for different sized pipes and it is of particular utility in large size gas and oil mains where a leak-tight coupling is necessary. The packing being first compressed about the pipe and then drawn firmly against the coupling sleeve will prevent leakage between the pipe and packing, as so often occurs where the packing is only drawn and held against the sleeve without any positive pressure in the direction of the surface of the pipe it surrounds.

A further advantage of this invention is the easy application of this attachment to the arm and L and T joint.

The simplicity of construction and ease of application of this attachment is obvious.

While the preferred forms of this invention are illustrated upon the accompanying sheets of drawing yet it is to be understood that minor detail changes may be made without departing from the scope thereof.

Figure 1 is a longitudinal vertical sectional view taken through a sleeve joint with this improved attachment in place. Fig. 2 is a view in front elevation of the follower or securing ring. Fig. 3 is a view in side elevation of the same. Fig. 4 is a transverse, vertical, sectional view taken upon the line 4—4 of Fig. 2. Fig. 5 is a view in front elevation of the split ring or collar. Fig. 6 is a transverse, vertical, sectional view taken on the line 6—6 of Fig. 5. Fig. 7 is a similar view of a modified form of the split ring or collar. Fig. 8 is a top plan view of an L or T joint, with parts broken away, illustrating in section the application of this attachment to one arm thereof. Fig. 9 is a view in side elevation of one arm of such a joint. Fig. 10 is a top plan view partly in section illustrating the application of a modification of this attachment to one arm of an L or T joint. Fig. 11 is a view in side elevation of a modified form of collar or securing ring. Fig. 12 is a view in side elevation of a modified form of split ring or collar.

An embodiment of this invention is illustrated in Fig. 1 of the drawing in which the ends 1 and 2 of the pipes are threaded and screwed into an interiorly screw-threaded coupling sleeve 3, which is an ordinary form of pipe coupling. Where a pipe line has been laid employing joints of this kind and it is necessary to stop a leak at one or both ends of the coupling sleeve, a packing 4 of lead, rubber, or other material, preferably in the form of a strip with overlapping ends, is laid about the surface of the pipe adjacent the end of the coupling sleeve. A split ring or divided collar 5 having a shouldered recess and an outer tapering surface is placed about the packing. A divided securing ring or follower 6 having a tapering shouldered recess is placed about the collar 5. If the coupling leaks at both ends, a packing strip, collar, and follower are placed upon the other end, if not, it is only necessary to place the follower 6 thereon. Bolts 7 are passed through apertures therefor in the two followers and the followers are drawn toward each other by taking up the nuts 8 on the ends of the bolts.

The diameter of the shouldered portion 9 of the split ring or collar 5 is such as to make a snug fit with the surface of the pipe and the diameter of the recess portion 10 is slightly greater than that of the coupling sleeve when the parts are brought together. The outer surface 11 of the collar is tapered decreasing in diameter toward the shouldered portions 9, and the collar is divided transversely having opposite angularly disposed contacting edges 12.

The follower or securing ring 6 is provided with a recess having sides 13 tapered to receive the collar 5 therein when the parts are together and a shoulder 14 to engage the shoulder of the collar when wholly received within the ring. The follower is divided transversely, having oppositely disposed angular meeting edges 15. The angular ends of each section lie in the same plane and each end of one section is provided with an upstanding rib across its longitudinal surface having an angular extension forming in effect a hook 16 adapted to be received within a similarly shaped recess 17 at each end of the other section so that the sections may be placed about the pipe, the ends engaged and slipped over each other. Bolt receiving apertures 18 are provided adjacent the recesses 17 and as many other bolt receiving apertures may be provided as necessary to secure the followers to each other.

The packing strip 4 is of greater thickness and width than the depth and height of the recess 10 of the collar 5.

The first action of the taking up of the nuts 8 on the bolts 7 is to draw the sections of the follower together as the head or nut of the bolts adjacent the recesses 17 engage the ends of the other sections. Upon drawing the followers toward each other the tapered recess engaging the taper upon the split collar will draw the parts of the collar together and compress the packing about the surface of the pipe and continued movement of the followers toward each other will compress the packing between the shoulder of the collar and the coupling sleeve whereby the joint between the sleeve and the pipe is surrounded by a packing held firmly not only against the sleeve but also against the pipe to prevent any leakage between the packing and the sleeve or the packing and the pipe.

The opposite angularly disposed contacting edges of the portions of the collar 5 may be straight and lie in parallel planes at an angle to the end of the collar as 12 on Fig. 6 or they may be formed on each portion in different planes at any angle to each other as 12ᵃ on Fig. 7, as the pointed ends of the contacting edges of the collar lie in a plane at right angles to the edge of the packing strip.

In the larger pipe lines the ends of the pipes are brought together under a coupling sleeve but are not screw-threaded thereto and in such cases this attachment forms a part of the coupling as the sleeve is positioned centrally over the meeting edges of the pipes and the drawing together of the followers makes a firm connection with each end of the sleeve with the adjacent pipe.

Where the attachment is to be applied as the coupling is made, a one-piece follower 19, Fig. 10, may be used and in such a case the collars 20 may not be divided but may be split at one point as illustrated on Fig. 12.

In order to utilize this attachment upon L and T joints the arms 21 of such joint are provided with an integral flange 22 adjacent their ends to act as a follower as shown on Figs. 8, 9, and 10. Fig. 8 shows the application of this attachment to a screw-threaded joint connection and Fig. 10 to a threadless sleeve coupling. In the latter case, the flange 22 is provided with a recess 23 to engage and compress the collar 5 and packing 4.

What I claim is:—

1. In a device of the character described, the combination with a pipe and a coupling sleeve, a packing about the pipe adjacent the sleeve, a transversely angularly split collar having parallel inclined edges and a recess adapted to receive and compress the packing and a tapered exterior, a follower having a tapered recess to receive the collar, and means to draw the follower toward the sleeve compressing the packing about the pipe and against the sleeve.

2. In a device of the character described, the combination with a pipe and a coupling sleeve, a packing about the pipe adjacent the sleeve, a transversely angularly split collar having parallel inclined edges and a recess and a shoulder adapted to receive and compress the packing and a tapered exterior, a follower having a tapered recess to receive the collar and means to draw the follower toward the sleeve compressing the packing about the pipe and between the shoulder and sleeve.

3. In a device of the character described, the combination with a pipe and a coupling sleeve, a packing about the pipe adjacent the sleeve, a transversely angularly split collar having parallel inclined edges and a recess adapted to receive and compress the packing and a tapered exterior, a follower having a tapered recess to receive the collar and a shoulder to engage the sleeve when wholly received within the recess, and means to draw the follower toward the sleeve compressing the packing about the pipe and against the sleeve.

4. In a device of the character described, the combination with a pipe and a coupling sleeve, a packing about the pipe adjacent the sleeve, a transversely angularly split collar having parallel inclined edges and a recess adapted to receive and compress the packing and a tapered exterior, a transversely divided follower having oppositely disposed angularly meeting edges and a tapered recess provided to receive the collar, and means to draw the sections of the follower together and the follower toward the sleeve compressing the packing about the pipe and against the sleeve.

5. In a pipe coupling comprising a coupling sleeve surrounding the ends of two pipes, the combination of a packing about each pipe adjacent the sleeve, transversely angularly split collars having parallel inclined edges and recesses receiving each packing and tapered exterior surfaces, with transversely divided followers having oppositely disposed angular interlocking meeting edges and tapered recesses engaging each tapered collar, each section of each follower provided with bolt receiving apertures adjacent the meeting edges, bolts passing through said apertures adapted to engage the adjacent edge of the other section of the follower, and means holding the sections of the follower in line with the packing under compression about the pipe and between the collars and the sleeve.

WM. F. STAGGERS, Jr.